United States Patent [19]

Tokunaga et al.

[11] Patent Number: 5,057,373

[45] Date of Patent: Oct. 15, 1991

[54] MAGNETIC RECORDING MEDIUM

[75] Inventors: Fumihiro Tokunaga; Jun Nakagawa; Tsutomu Okita; Toshio Kawamata, all of Kanagawa, Japan

[73] Assignee: Fuji Photo Film Co., Ltd., Kanagawa, Japan

[21] Appl. No.: 330,578

[22] Filed: Mar. 30, 1989

[30] Foreign Application Priority Data

Mar. 31, 1988 [JP] Japan .................................. 63-76396

[51] Int. Cl.$^5$ ............................................. G11B 23/00
[52] U.S. Cl. .................................. 428/413; 428/425.9; 428/694; 428/695; 428/900
[58] Field of Search ............ 428/694, 900, 695, 425.9, 428/413

[56] References Cited

U.S. PATENT DOCUMENTS

| 4,726,992 | 2/1988 | Asai et al. | 428/425.9 |
| 4,784,907 | 11/1988 | Matsufugi et al. | 428/695 |
| 4,784,914 | 11/1988 | Matsufugi et al. | 428/695 |
| 4,847,156 | 7/1989 | Nishikawa et al. | 428/695 |
| 4,857,402 | 8/1989 | Nishikawa et al. | 428/695 |
| 4,952,458 | 8/1990 | Miyoshi | 428/694 |
| 4,965,120 | 10/1990 | Ono et al. | 428/694 |
| 4,970,121 | 11/1990 | Tokunaga et al. | 428/695 |

Primary Examiner—Paul J. Thibodeau
Attorney, Agent, or Firm—Sughrue, Mion, Zinn, Macpeak & Seas

[57] ABSTRACT

A magnetic recording medium comprising a nonmagnetic support having thereon a magnetic layer comprising a binder and ferromagnetic particles dispersed therein, wherein the binder comprises (a) a vinyl chloride resin, (b) a phenoxy resin, (c) a polycarbonate polyurethane resin and (d) a polyisocyanate; and said magnetic layer further comprises at least one lubricating agent selected from the group consisting of polyalkylnenoxide alkylphosphate, an alkali salt thereof, and lecithin.

10 Claims, 1 Drawing Sheet

MAGNETIC RECORDING MEDIUM

FIELD OF THE INVENTION

This invention relates to a magnetic recording medium having improved stability with passage of time, still durability and outputs.

BACKGROUND OF THE INVENTION

Magnetic recording media comprising a non-magnetic support having thereon a magnetic layer containing ferromagnetic particles such as ferromagnetic iron oxide or ferromagnetic alloy particles dispersed in a binder are mainly used as magnetic recording media such as an audio tape, a video tape, a tape for computers or a magnetic discs.

With recent developments in the field of this technology, higher density recording and higher efficiencies have been required for magnetic recording media. Toward this end, research has particularly focused on the binder used in the magnetic layer of a magnetic recording medium. Binders having good wear resistance and weather resistance have been developed, and it has been suggested to use, for example, polycarbonate polyurethanes used in combination with nitrocellulose and copolymer resins of vinyl chloride and vinylacetate as described in JP-A-58-60430, JP-A-60-13324, JP-A-61-9830 and U.S. Pat. No. 4,761,338. (The term "JP-A" as used herein means an "unexamined published Japanese patent application"). Also, the use of vinyl chloride and vinyl chloride resins containing a polar group has been suggested, which are used in combination with polyurethane as described in JP-A-61-253627. Lubricating agents have been studied to improve still durability, and alkali salts of a polyalkyleneoxide alkylphosphate (described in JP-A-50-40103) and lecithin (described in JP-B-52-3348) have been suggested. (The term "JP-B" as used herein means an "examined Japanese patent publication").

However, when these lubricating agents are used in the binder of a magnetic recording medium, only some of the characteristics of the medium can be improved, and further, these characteristics are merely partially improved. Moreover, use of these lubricating agents has not brought about improvement in all of the following respects: stability with the passage of time (adhesive property), still durability, output, gloss, and squareness ratio.

SUMMARY OF THE INVENTION

Accordingly, an object of the present invention is to provide a magnetic recording medium having improved efficiencies in all of the above-mentioned respects.

Other objects and effects of the present invention will be apparent from the following description.

The above objects of the present invention have been attained by a magnetic recording medium comprising a non-magnetic support having thereon a magnetic layer comprising a binder and ferromagnetic particles dispersed therein, wherein the binder comprises (a) a vinyl chloride resin, (b) a phenoxy resin, (c) a polycarbonate polyurethane resin and (d) a polyisocyanate; and the magnetic layer further comprises at least one lubricating agent selected from the group consisting of polyalkylenoxide alkylphosphate, an alkali salt thereof, and lecithin.

In accordance with this invention, hydrolysis characteristics and stability with the passage of time become excellent, and the dispersibility of the ferromagnetic particles, the squareness ratio and output can be greatly improved.

BRIEF DESCRIPTION OF DRAWINGS

The sole figure of the drawing schematically shows an apparatus for measuring adhesive property (adhesive strength) used in the Examples of the present invention.

DETAILED DESCRIPTION OF THE INVENTION

Figure 1:
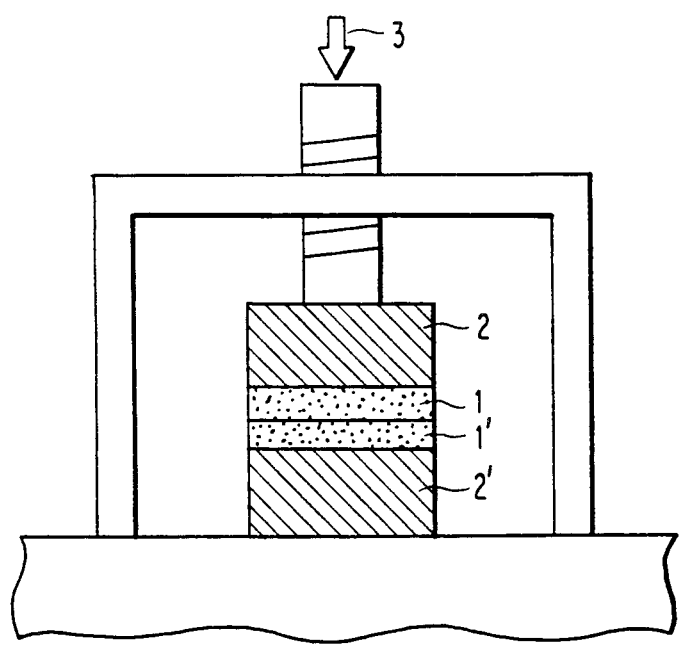

The vinyl chloride resin (a) referred to in this invention may be a copolymer of vinyl chloride and a copolymerizable monomer such as vinyl acetate, vinylidene chloride, acrylonitrile, styrene, or an acrylic acid ester. The vinyl chloride resin is preferably bonded with an epoxy group and an $SO_3M$ group wherein M is Li, Na, or K, most preferably Na. The vinyl chloride resin preferably has a number average molecular weight of from 15,000 to 60,000, and more preferably from 20,000 to 55,000. The vinyl chloride resin preferably contains a vinyl chloride content in an amount of from 80 to 90 wt % and preferably contains a copolymerizable monomer in an amount of from 10 to 20 wt %. The $—SO_3M$ group is preferably present in the vinyl chloride resin in an amount of from 0.1 to 2.0 wt %, more preferably from 0.3 to 1.5 wt %, and the epoxy group is preferably present in the vinyl chloride resin in an amount of from 0.2 to 2.7 wt %, more preferably from 0.7 to 2.2 wt %.

A phenoxy resin (b) which can be used in the present invention may be a resin produced from bisphenol A and epichlorohydrin preferably having a molecular weight of from 14,000 to 57,000 represented by the following formula:

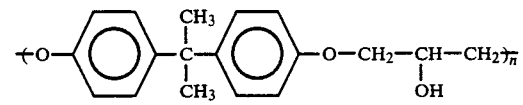

wherein n is from 50 to 200.

Specific examples of the phenoxy resin include those commercially available under the trade name of "BAKELITE Phenoxy Resin PKHH" produced by Union Carbide Co., Ltd., or the trade name "DER-686" produced by Dow Chemical Co., Ltd.

Examples of the polycarbonate polyurethane (c) which can be used in this invention include the above-mentioned polycarbonate polyester polyurethanes which are described in JP-A-58-60430 and the above-mentioned polycarbonate polyurethanes which are described in JP-A-60-13324 and U.S. Pat. No. 4,761,338. The polycarbonate polyurethane of the present invention is present in an amount of from 20 to 70 wt % based on the total weight of the binder.

The above-mentioned polycarbonate polyester polyurethane preferably is a polyurethane comprised of a polyol, a polyisocyanate and, if necessary, a chain extending agent. The polyol preferably is a polycarbonate polyol or a polyester polyol comprised of 1,10-decanedicarboxylic acid and polycarbonate polyol. The polycarbonate polyol can be obtained by condensing polyhydric alcohol with phosgen, chloroformic acid ester, dialkylcarbonate or diallylcarbonate.

Examples of the above-described polyhydric alcohol include 1,10-decanediol, 1,6-hexanediol, 1,4-butanediol, 1,3-butanediol, neopentyl glycol and 1,5-pentanediol.

Examples of the polyisocyanate, which is to be reacted with the above-described polyol includes tolylene diisocyanate, 1,5-diphenylmethane diisocyanate, xylene diisocyanate, 1,5-naphthylene diisocyanate, hexamethylene diisocyanate, o-tolylene diisocyanate and the adduct product of these isocyanates with active hydrogen compounds.

Examples of the chain extending agent which can be used, if necessary, in the above-mentioned polyurethane include the above-described polyhydric alcohols, aliphatic polyamines, alicyclic polyamines and aromatic polyamines.

The above-mentioned polycarbonate polyurethanes which can be used in this invention can be obtained by a urethanated reaction of a polycarbonate polyol and a polyhydric isocyanate. The polycarbonate polyol and the polyhydric isocyanate used herein may be those described for the polycarbonate polyester polyurethane.

Other polyhydric alcohols and conventional chain extending agents may be used in combination with the above-mentioned urethanated reactions.

The polycarbonate polyurethane used in this invention can be prepared by heating the above-described polyol and polyhydric isocyanate in a nitrogen atmosphere, in the presence of, if necessary, catalysts, amide solvents, sulfooxide solvents, cyclic ether solvents, ketone solvents and/or glycol ether solvents at from 60° C. to 100° C. for several hours to prepare a prepolymer, and then continuously heating the prepolymer at from 60° C. to 100° C. until a polymer is formed.

In this invention, the above-described three components ((a), (b), and (c)) are used as the main components for a binder and polyisocyanate (d) is used as a hardening agent. The term "binder" used herein means the whole of the components (a), (b), (c) and (d).

As the polyisocyanate (d) used in this invention, any of polyisocyanates used in this field of art as a hardening agent of binders.

The compounding proportions of the above-mentioned three components of the binder are as follows. The chloride resin is preferably present in an amount of from 15 to 65 wt %, more preferably from 20 to 55 wt %, the phenoxy resin is preferably present in an amount of from 10 to 60 wt %, more preferably from 15 to 50 wt %, and the polycarbonate polyurethane resin is preferably present in an amount of from 25 to 75 wt %, more preferably from 30 to 70 wt %, based on the total weight of the three components (a), (b) and (c) of the present invention. The polyisocyanate is preferably present in an amount of from 5 to 30 parts by weight based on 100 parts by weight of the three components (a), (b), and (c) of the present invention. The total weight of the binder is preferably in an amount of from 20 to 70 parts by weight based on 100 parts by weight of ferromagnetic particles in the magnetic layer.

Still durability, squareness ratio, gloss and output are deteriorated when the vinyl chloride resin (a) is not used in a magnetic recording medium. Still durability and output are deteriorated when the phenoxy resin (b) is not used. Still durability is greatly deteriorated when the polycarbonate polyurethane resin (c) is not used, and still durability and output are both deteriorated when the polyisocyanate (d) is not used. When a vinyl chloride resin (a), a phenoxy resin (b), a polycarbonate polyurethane (c), and a polisocyanate (d) are used simultaneously with the lubricating agent a magnetic recording medium can be obtained which exhibits excellent properties in all of the following respects: still durability, adhesive strength, squarenes ratio, gloss and output.

As a lubricating agent, a polyalkyleneoxide alkylphosphate and an alkali salt thereof which is used in the magnetic layer of the present invention as a lubricating agent are disclosed in JP-A-50-40103. For example, the polyalkyleneoxide alkylphophate (and/or an alkali salt thereof) can be the phosphoric acid ester (or an alkali salt thereof) having the following formulae (I), (II) and (III).

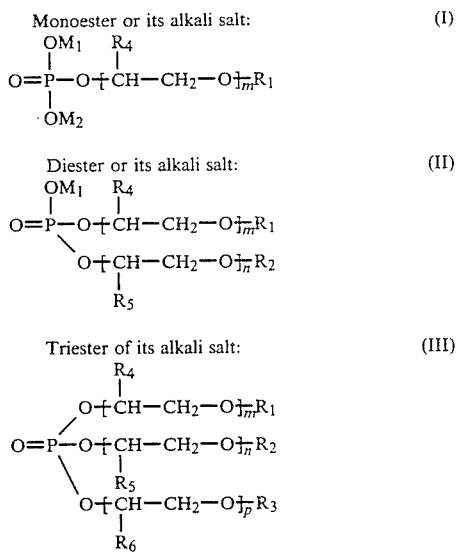

In formulae (I), (II) and (III), $R_1$, $R_2$ and $R_3$, which may be the same or different, each is a monovalent group having from 6 to 28 carbon atoms, preferably an alkyl group, a substituted alkyl group substituted with an alkoxy group, a phenyl group or a phenoxy group; $R_4$, $R_5$ and $R_6$, which may be the same or different, each is a hydrogen atom, a methyl group or an ethyl group; $M_1$ and $M_2$ each is a hydrogen atom, a sodium atom, a potassium atom or $N(R_7)_q$ $(R_8)_{4-q}$, wherein $R_7$ and $R_8$ each is a hydrogen atom, a methyl group, an ethyl group, a hydroxyethyl group or a hydroxypropyl group and q is an integer of from 1 to 4; m, n and p, which may be the same or different, each is an integer of from 4 to 12.

In case when compounds having formulae (I), (II) and (III) are used in mixture, the weight mixing ratio of (I) and (II) ((I):(II)) is preferably from about 2:8 to about 8:2, and the weight mixing ratio ((I)+(II):(III)) is preferably from about 10:0.01 to about 10:5.

The alkali salt of a polyalkyleneoxide alkylphosphate can be prepared by reacting a polyalkyleneoxide alkylphosphate with an alkali such as sodium hydroxide, potassium hydroxide, ammonia, monoethanol amine, diethanol amine or triethanol amine.

Below are examples of compounds having formulae (I), (II) and (III), but the present invention is not to be construed as being limited thereto.

Compound I-1:

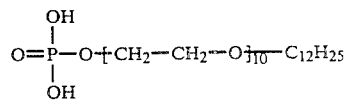

Compound I-2:

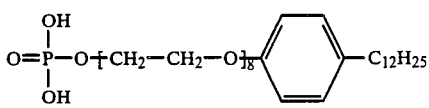

Compound I-3:

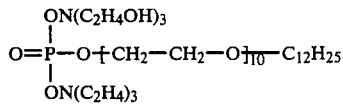

Compound I-4:

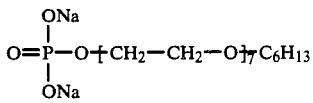

Compound I-5:

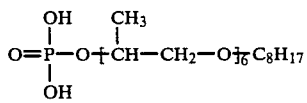

Compound II-1:

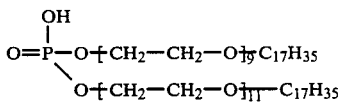

Compound II-2:

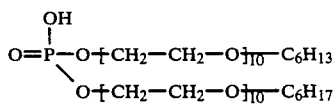

Compound II-3:

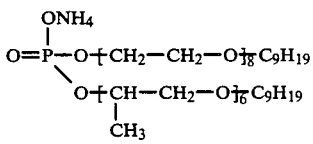

Compound II-4:

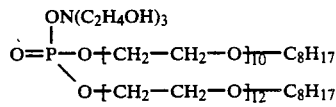

Compound III-1:

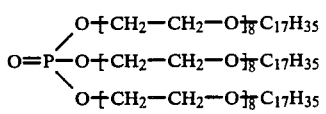

Compound III-2:

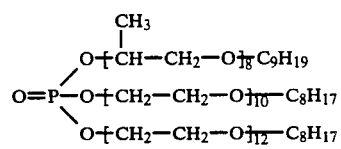

In this invention, lecithin may be used instead of or with the above described phosphate or the alkali salt thereof. Lecithin is disclosed in JP-B-52-33482.

In this invention, the above-described lubricating agent is present in an amount of preferably from 0.08 to 8 parts by weight, more preferably from 0.3 to 5 parts by weight, based on 100 parts by weight of the ferromagnetic particles in the magnetic layer.

Examples of the ferromagnetic particles which can be used in this invention include $\gamma\text{-}Fe_2O_3$, Co-containing $\gamma\text{-}Fe_2O_3$, $Fe_3O_4$, Co-containing $Fe_3O_4$, $\gamma\text{-}FeOx$ ($1.33 < x \leq 1.50$), Co-containing $\gamma\text{-}FeOx$ ($1.33 < x \leq 1.5$), $CrO_2$, Ce-Ni-P alloy, Co-Ni-Fe alloy, Fe-Ni-Zn alloy, Ni-Co alloy, Co-Ni-Fe-Be alloy and hexagonal crystal plate like barium ferrite. These ferromagnetic particles preferably have an average particle size of from about 0.005 to 2 $\mu$m and the ratio of axis length/axis width preferably is from 1/1 to 50/1. The specific surface area thereof preferably is from 1 to 70 $m^2/g$.

In this invention, additives such as dispersing agents, antistatic agents or the like can additionally be added into the magnetic layer. These additives are disclosed in JP-B-56-26890.

In this invention, the above described ferromagnetic particles, abrasive agents and binders, and if necessary, other additives are mixed and kneaded using organic solvents to prepare a magnetic coating composition which is then coated on a non-magnetic support and dried to form a magnetic layer.

Examples of solvents which can be used to prepare the magnetic coating composition include ketone solvents (e.g., acetone, methyl ethyl ketone, methyl isobutylketone, cyclohexanone, isophorone, tetrahydrofuran), alcohol solvents (e.g., methanol, ethanol, propanol, butanol, isobutyl alcohol, isopropyl alcohol, methyl hexanol), ester solvents (e.g., methyl acetate, ethyl acetate, butyl acetate, isobutyl acetate, isopropyl acetate, ethyl lactate, glycol acetate, monoethyl ether), glycol ether solvents (e.g., ether, glycol dimethyl ether, glycol monomethyl ether, dioxane), aromatic hydrocarbon solvents (e.g., benzene, toluene, xylene, cresol, chlorobenzene, styrene), chlorinated hydrocarbon solvents (e.g., methylene chloride, ethylene chloride, carbon tetrachloride, chloroform, ethylene chlorohydrin, dichlorobenzene), N,N-dimethyl formamide, and hexane.

Materials for forming a non-magnetic support include polyester resins, polyolefin resins, cellulose derivatives, polycarbonate resins, polyimide resins and polyamide imide resins. Also depending upon the purposes of use, aluminum, copper, tin and zinc, non-magnetic metals containing the above metals, plastics vapor-deposited with metals such as aluminum, paper and paper coated or laminated with polyolefins can be used. The shape of the non-magnetic support is not particularly limited, and a sheet shape support is generally used. The non-magnetic support may have a film shape, a tape shape, a disk shape, a card shape or a drum shape.

When a sheet shape non-magnetic support is used, it has a thickness of generally from 5 to 50 $\mu$m.

A backing layer may be provided on the surface of the non-magnetic support which is opposite to the surface coated with the magnetic layer.

The magnetic layer thus provided on the non-magnetic support is generally provided with magnetic orientation to orientate the ferromagnetic particles contained in the magnetic layer, and then dried. Further, if necessary, the magnetic layer is provided with a calendering treatment as a surface treatment, and thereafter is cut to a desired shape.

This invention will be illustrated by the following Examples and Comparative Examples, but is not to be construed as being limited thereto. All parts are by weight unless otherwise indicated.

EXAMPLES AND COMPARATIVE EXAMPLES

Magnetic recording media Samples Nos. 1 to 25 were prepared by the following manner.

The magnetic coating composition having the following formulation was coated on a polyethylene terephthalate film having a thickness of 30 μm, dried and provided with a mirror treatment to obtain a magnetic layer having a thickness of 5 μm.

| | |
|---|---|
| Co-containing $\gamma$-Fe$_2$O$_3$' (specific surface area $S_{SET}$: 30 m$^2$/g) | 100 parts |
| Vinyl chloride acetate compound | Kinds and amounts shown in Table 1 |
| Phenoxy resin ("BAKELITE phenoxy resin PKHH" produced by Union Carbide Co., Ltd.) | Amounts shown in Table 1 |
| Urethane resin | Amounts shown in Table 1 |
| Carbon black (average particle diameter: 120 nm) | 10 parts |
| $\gamma$-Al$_2$O$_3$ (average particle diameter: 0.38 μm) | 1 part |
| Lecithin (produced by Nisshin Oil Co., Ltd.) | Amounts shown in Table 1 |
| Phosphoric acid ester ("GAFACRE-610" produced by GAF CO., LTD.) | Amounts shown in Table 1 |
| Butyl stearate | 1 part |
| Methyl ethyl ketone | 60 parts |
| Toluene | 80 parts |
| Tetrahydrofuran | 60 parts |
| Isocyanate compound | 7 parts |

The polycarbonate polyurethane used in Sample Nos. 1 to 16 and 19 to 25 was prepared in accordance with the disclosure of Example 1 of JP-A-60-13324, and the polycarbonate polyester urethane used in Sample No. 17 was synthesized in the same manner as that in Example 1 as disclosed in JP-A-58-60430.

The polyester polyurethane used in Sample No. 18 was "C7209" produced by DAINIPPON INK AND CHEMICALS, INC.

The vinyl chloride resin "400×110A" was a product of Nippon Zeon Co., Ltd., and "TPR-TM" was a product of Nisshin Chemical Industries, Ltd.

The following tests were performed on the samples thus obtained, and the results are shown in Table 2.

Adhesive strength

As shown in the drawing of FIG. 1, using a microtablet molding device produced by Hitachi, Ltd., two sample tapes having surface areas of 3.18 cm$^2$ (1.27 cm ×1.85) cm were placed one on top of the other, with their magnetic layers face to face, sandwiched between two spacers (1 and 1') through glass plates (2 and 2'), and were pressed at a torque (3) of 60 kg/cm$^2$. The magnetic layers were allowed to stand at the above condition at 50° C. for 5 hours, and thereafter both tapes were pulled in the direction parallel to their surfaces by a pulling device to measure the adhesive strength in units of kg/3.18 cm$^2$.

When a binder of a magnetic recording medium becomes hydrolyzed and its molecular weight becomes lower (a phenomenon which occurs at high temperatures and high humidities), the low molecular weight substances exude when pressure is applied, and thus the surfaces of magnetic layers become adhesive, and the adhesive strength of such layers becomes higher. That is, the adhesive strength represents the adhesive characteristics and the degree of hydrolysis of the binder Gloss on the surface of the magnetic layer Gloss was measured in accordance with JIS Z8741 and is shown in Table 2 in terms of relative values when mirror wise gloss on the surface of glass having a refractive index of 1.567 at an angle of incidence of 45° is 100%.

Squareness ratio

The squareness ratio Br/Bm was measured at Hm of 2 KOe using an oscillating magnetic flux meter produced by Toei Kogyo Co., Ltd.

Still durability

Screen image signals of image signals 501RE were recorded and reproduced at a still mode. While the reproduced RF output level was being recorded with a recorder, the period of time for the signal level to decrease to half of the initial level was measured.

The thermo-treated samples (60° C. at 80% RH for 7 days) and unthermo-treated samples were tested to demonstrate the effects of the present regarding still durability and adhesive strength.

Output

The output was measured using a video tape recorder "V500D" produced by Toshiba Corporation equipped with a ferrite head. In Table 2, the output is shown in terms of relative values when Sample No. 10 had an output value of 0 dB.

In Table 2, Sample Nos. 1, 2, 6, 10, 12, 18 and 19 are comparative examples, and the others are examples of the present invention.

TABLE 1

| Sample No. | Vinyl chloride resin (wt %) | | Phenoxy resin (wt %) | Urethane resin (wt %) | | Polyisocyanate (part) | Lubricant (part) | |
|---|---|---|---|---|---|---|---|---|
| 1 | MPR-TM | 0 | 70 | Polycarbonate Polyurethane | 30 | 7 | Lecithin | 3 |
| 2 | MPR-TM | 0 | 30 | Polycarbonate Polyurethane | 70 | 7 | Lecithin | 3 |
| 3 | MPR-TM | 15 | 60 | Polycarbonate Polyurethane | 25 | 7 | Lecithin | 3 |
| 4 | MPR-TM | 15 | 10 | Polycarbonate Polyurethane | 75 | 7 | Lecithin | 3 |
| 5 | MPR-TM | 15 | 40 | Polycarbonate Polyurethane | 45 | 7 | Lecithin | 3 |
| 6 | MPR-TM | 40 | 0 | Polycarbonate Polyurethane | 60 | 7 | Lecithin | 3 |
| 7 | MPR-TM | 40 | 10 | Polycarbonate Polyurethane | 50 | 7 | Lecithin | 3 |
| 8 | MPR-TM | 40 | 25 | Polycarbonate Polyurethane | 35 | 7 | Lecithin | 3 |
| 9 | MPR-TM | 40 | 35 | Polycarbonate Polyurethane | 25 | 7 | Lecithin | 3 |
| 10 | MPR-TM | 40 | 60 | Polycarbonate Polyurethane | 0 | 7 | Lecithin | 3 |
| 11 | MPR-TM | 65 | 10 | Polycarbonate Polyurethane | 25 | 7 | Lecithin | 3 |
| 12 | MPR-TM | 35 | 25 | Polycarbonate Polyurethane | 40 | 0 | Lecithin | 3 |
| 13 | MPR-TM | 35 | 25 | Polycarbonate Polyurethane | 40 | 5 | Lecithin | 3 |
| 14 | MPR-TM | 35 | 25 | Polycarbonate Polyurethane | 40 | 15 | Lecithin | 3 |
| 15 | MPR-TM | 35 | 25 | Polycarbonate Polyurethane | 40 | 30 | Lecithin | 3 |
| 16 | 400 × 110A | 40 | 25 | Polycarbonate Polyurethane | 35 | 7 | Lecithin | 3 |
| 17 | 400 × 110A | 40 | 25 | Polycarbonate polyester polyurethane | 35 | 7 | Lecithin | 3 |
| 18 | 400 × 110A | 40 | 25 | Polyester Polyurethane | 35 | 7 | Lecithin | 3 |
| 19 | MPR-TM | 40 | 25 | Polycarbonate polyurethane | 35 | 7 | I-1 | 0 |
| 20 | MPR-TM | 40 | 25 | Polycarbonate polyurethane | 35 | 7 | I-1 | 0.08 |
| 21 | MPR-TM | 40 | 25 | Polycarbonate polyurethane | 35 | 7 | I-1 | 3 |
| 22 | MPR-TM | 40 | 25 | Polycarbonate polyurethane | 35 | 7 | I-1 | 8 |
| 23 | MPR-TM | 40 | 25 | Polycarbonate polyurethane | 35 | 7 | I-4 | 3 |
| 24 | MPR-TM | 40 | 25 | Polycarbonate polyurethane | 35 | 7 | II-2 | 3 |
| 25 | MPR-TM | 40 | 25 | Polycarbonate polyurethane | 35 | 7 | III-2 | 3 |

TABLE 2

| Sample No. | Adhesive strength | | Still durability | Squareness ratio | Gloss | Output |
|---|---|---|---|---|---|---|
| | Non-thermo-treated | Thermo-treated | | | | |
| 1 | 0.23 | 0.22 | 28 | 0.74 | 18 | −2.4 |
| 2 | 0.20 | 0.21 | 31 | 0.74 | 19 | −2.3 |
| 3 | 0.19 | 0.21 | >60 | 0.84 | 38 | −0.1 |
| 4 | 0.21 | 0.22 | >60 | 0.83 | 40 | −0.1 |
| 5 | 0.20 | 0.20 | >60 | 0.83 | 41 | 0 |
| 6 | 0.23 | 0.22 | 40 | 0.85 | 38 | −0.1 |
| 7 | 0.22 | 0.24 | >60 | 0.82 | 42 | 0 |
| 8 | 0.24 | 0.22 | >60 | 0.82 | 46 | 0 |
| 9 | 0.22 | 0.23 | >60 | 0.84 | 38 | −0.1 |
| 10 | 0.21 | 0.21 | 10 | 0.83 | 43 | 0 |
| 11 | 0.23 | 0.23 | 45 | 0.83 | 41 | 0 |
| 12 | 0.24 | 0.22 | 5 | 0.83 | 40 | −0.2 |
| 13 | 0.23 | 0.24 | >60 | 0.84 | 38 | −0.1 |
| 14 | 0.22 | 0.23 | >60 | 0.82 | 39 | −0.1 |
| 15 | 0.22 | 0.20 | >60 | 0.84 | 42 | 0 |
| 16 | 0.23 | 0.21 | >60 | 0.84 | 39 | −0.1 |
| 17 | 0.23 | 0.25 | >60 | 0.84 | 41 | 0 |
| 18 | 0.58 | 5.00 | >60 | 0.82 | 38 | −0.1 |
| 19 | 0.22 | 0.23 | >60 | 0.75 | 8 | −3.0 |
| 20 | 0.21 | 0.23 | >60 | 0.82 | 35 | −0.3 |

TABLE 2-continued

| Sample No. | Adhesive strength Non-thermo-treated | Adhesive strength Thermo-treated | Still durability | Squareness ratio | Gloss | Output |
|---|---|---|---|---|---|---|
| 21 | 0.24 | 0.22 | >60 | 0.84 | 39 | 0 |
| 22 | 0.23 | 0.24 | >60 | 0.85 | 43 | 0 |
| 23 | 0.22 | 0.23 | >60 | 0.83 | 39 | −0.1 |
| 24 | 0.23 | 0.24 | >60 | 0.84 | 40 | −0.1 |
| 25 | 0.23 | 0.22 | >60 | 0.83 | 41 | −0.1 |

Thermo-treated samples were tested and compared with non-thermo-treated samples to demonstrate the effect of the present invention on stability with passage of time (adhesive strength).

As is clear from the above results, the present invention improves still durability of a magnetic recording medium remarkably but does not increase adhesive strength (i.e., stability with passage of time is excellent).

It is also understood from the above results that invention remarkably improves squareness ratio and gloss, and as a result thereof output is remarkably improved as well.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising a binder and ferromagnetic particles dispersed therein, wherein said binder comprises (a) a vinyl chloride resin, (b) a phenoxy resin, (c) a polycarbonate polyurethane resin and (d) a polyisocyanate; wherein the amount of said vinyl chloride resin (a) is from 15 to 65 wt % based on the total amount of (a), (b) and (c), the amount of said phenoxy resin (b) is from 10 to 60 wt % based on the total amount of (a), (b) and (c), the amount of said polycarbonate polyurethane resin (c) is from 25 to 75 wt % based on the total amount of (a), (b) and (c), and the amount of said polyisocyanate (d) is from 5 to 30 parts by weight per 100 parts by weight of the total amount of (a), (b) and (c);

and said magnetic layer further comprises at least one lubricating agent selected from the group consisting of polyalkyleneoxide alkylphosphate, an alkali salt thereof, and lecithin.

2. A magnetic recording medium as claimed in claim 1, wherein said vinyl chloride resin is a copolymer comprises from 80 to 90 wt % of vinyl chloride and from 10 to 20 wt % of monomers other than vinyl chloride.

3. A magnetic recording medium as claimed in claim 1, wherein said vinyl chloride resin is a vinyl chloride-vinyl acetate copolymer.

4. A magnetic recording medium as claimed in claim 1, wherein said vinyl chloride resin contains groups —$SO_3M$ in an amount of from 0.1 to 2.0 wt % based on the total amount of said vinyl chloride resin wherein M represents Li Na or K and epoxy groups in an amount of from 0.2 to 2.7 wt % based on the total amount of said vinyl chloride resin.

5. A magnetic recording medium as claimed in claim 4, wherein M represents Na.

6. A magnetic recording medium as claimed in claim 1, wherein said vinyl chloride resin has a number average molecular weight of from 15,000 to 60,000.

7. A magnetic recording medium as claimed in claim 1, wherein the amount of said lubricating agent is from 0.08 to 8 parts by weight per 100 parts by weight of ferromagnetic particles.

8. A magnetic recording medium as claimed in claim 1, wherein the amount of said binder is from 20 to 70 parts by weight per 100 parts by weight of said ferromagnetic particles.

9. A magnetic recording medium as claimed in claim 1, wherein said at least one lubricating agent is a polyalkyleneoxide alkylphosphate or an alkali salt thereof.

10. A magnetic recording medium as claimed in claim 9, wherein said polyalkyleneoxide alkylphosphate or an alkali salt thereof comprises at least one phosphoric acid ester represented by formulae (I), (III) or (III).

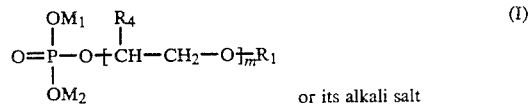

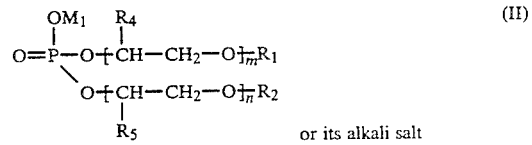

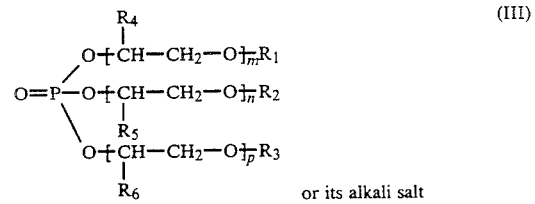

wherein $R_1$, $R_2$ and $R_3$ may be the same or different, and each is a monovalent group having from 6 to 28 carbon atoms; $R_4$, $R_5$ and $R_6$ may be the same or different, and each is a hydrogen atom, a methyl group or an ethyl group; $M_1$ and $M_2$ each is a hydrogen atom, a sodium atom, a potassium atom or $N(R_7)_q (R_8)_{4-q'}$ wherein $R_7$ and $R_8$ each is a hydrogen atom, a methyl group, an ethyl group, a hydroxyethyl group or a hydroxypropyl group and q is an integer of from 1 to 4; m, in and p, which may be the same or different, each is an integer of from 4 to 12.

* * * * *